United States Patent [19]
Jepson et al.

[11] Patent Number: 5,708,211
[45] Date of Patent: Jan. 13, 1998

[54] FLOW REGIME DETERMINATION AND FLOW MEASUREMENT IN MULTIPHASE FLOW PIPELINES

[75] Inventors: William Paul Jepson, Athens; Robert Joseph Wilkens, Glouster, both of Ohio; Jeffrey Joseph Maley, St. Marys, W. Va.

[73] Assignee: Ohio University, Athens, Ohio

[21] Appl. No.: 785,478

[22] Filed: Jan. 17, 1997

Related U.S. Application Data

[60] Provisional application No. 60/018,440, May 28, 1996.
[51] Int. Cl.⁶ .................................................. G01F 1/74
[52] U.S. Cl. ......................... 73/861.04; 73/861.42
[58] Field of Search ...................... 73/861.04, 861.42, 73/861.43, 861.44, 861.45

[56] References Cited

U.S. PATENT DOCUMENTS

| | | | |
|---|---|---|---|
| 4,231,262 | 11/1980 | Boll et al. | 73/861.04 |
| 4,391,149 | 7/1983 | Herzl | 73/861.04 |
| 4,574,643 | 3/1986 | Scott et al. | 73/861.04 |
| 4,576,043 | 3/1986 | Nguyen | 73/861.04 |
| 5,591,922 | 1/1997 | Sergeral | 73/861.04 |

FOREIGN PATENT DOCUMENTS

| 1649276 A | 5/1991 | U.S.S.R. | 73/861.52 |
|---|---|---|---|

OTHER PUBLICATIONS

Robert Wilkens and W. Paul Jepson, "Studies of Multiphase Flow in High Pressure Horizontal and +5 Degree Inclined Pipelines", from Proceedings of the Sixth (1996) International Offshore and Polar Engineering Conference (1996), Los Angeles, CA, May 26–31, 1996, ISBN 1-880653-22-2 (Set); ISBN 1-880653-24-9 (vol. II), pp. 139 through 146.

*Primary Examiner*—Richard Chilcot
*Assistant Examiner*—Max H. Noori
*Attorney, Agent, or Firm*—Killworth, Gottman, Hagan & Schaeff, L.L.P.

[57] ABSTRACT

A predetermined multiphase flow anomaly, for example, a plug, a slug, or a pseudo-slug, in a pipeline may be identified by identifying an analysis pipe section containing a multiphase fluid flow, measuring a first differential pressure at a first pair of pressure measuring points positioned along the analysis pipe section, measuring a second differential pressure at a second pair of pressure measuring points positioned along the analysis pipe section, identifying a primary drop in the first differential pressure and a secondary drop in the second differential pressure, measuring a time delay between initiation of the primary pressure drop and initiation of the secondary pressure drop, and determining as a function of the time delay whether the primary pressure drop corresponds to a predetermined multiphase flow anomaly moving through the pipe analysis section.

33 Claims, 7 Drawing Sheets

FLOW REGIME DETERMINATION AND FLOW MEASUREMENT IN MULTIPHASE FLOW PIPELINES

CROSS REFERENCE TO RELATED APPLICATIONS

This application claims the benefit of U.S. Provisional application Ser. No. 60/018,440, filed May 28, 1996.

BACKGROUND OF THE INVENTION

The present invention relates to multiphase flow in pipelines, and, in particular, to flow regime analysis of a multiphase mixture of materials through a pipeline.

Brine and carbon dioxide gas are commonly present in oil pipelines. This oil, water, and gas mixture creates a highly corrosive environment for typical carbon steel pipelines. To compound the problem, as oil wells are often at remote locations, the corrosive mixture must be transported long distances before it can be separated. During this transport, the multiphase mixture travels through numerous changes of inclination, affecting the flow pattern and flow characteristics of the multiphase pipeline so as to further compound the pipeline corrosion problem.

Because the consequences of a major oil line break are undesirable, it is important to quantify the corrosivity of multiphase flow under varying conditions so effective corrosion control can be achieved. The first step in determining the predominant corrosion mechanisms is to understand the nature of the flow. Further, the location and frequency of certain flow anomalies, described in detail below, must be determined to address and control pipeline corrosion through installation of phase separators and slug diverters, and through other pipeline design modifications. However, as is noted above, because oil pipelines and other multiphase pipelines are commonly constructed of carbon steel and other non-transparent materials, it is problematic to monitor the flow characteristics of many multiphase pipelines. Accordingly, there is a need for a non-visual method of multiphase flow analysis whereby a predetermined flow anomaly, e.g., a rolling wave, a plug, a slug, or a pseudo-slug, can be accurately identified.

SUMMARY OF THE INVENTION

This need is met by the present invention wherein a technique has been established for determining slug properties and flow patterns of multiphase flow through a pipeline using differential pressure measurements.

In accordance with one embodiment of the present invention, a method of identifying a predetermined multiphase flow anomaly in a pipe is provided comprising the steps of: identifying an analysis pipe section containing a multiphase fluid flow; measuring a first differential pressure at a first pair of pressure measuring points positioned along the analysis pipe section, the first pair of pressure measuring points including a primary upstream measuring point and a primary downstream measuring point separated by a primary pipe distance; measuring a second differential pressure at a second pair of pressure measuring points positioned along the analysis pipe section, the second pair of pressure measuring points including a secondary upstream measuring point and a secondary downstream measuring point separated by a secondary pipe distance; identifying a primary drop in the first differential pressure; identifying a secondary drop in the second differential pressure; measuring a time delay between initiation of the primary pressure drop and initiation of the secondary pressure drop; and determining as a function of the time delay whether the primary pressure drop corresponds to a predetermined multiphase flow anomaly moving through the pipe analysis section.

The step of identifying a primary drop in the first differential pressure may comprise plotting a primary differential pressure trace as a function of time and locating the primary pressure drop along the primary differential pressure trace. The primary pressure drop may be characterized by a pressure drop of at least approximately 1500 Pa. The step of identifying a secondary drop in the second differential pressure may comprise plotting a secondary differential pressure trace as a function of time and locating the secondary pressure drop along the secondary differential pressure trace. The secondary pressure drop may be characterized by a pressure drop of at least approximately 150 Pa.

The step of measuring a time delay may comprise (i) plotting a primary differential pressure trace as a function of time and locating the primary pressure drop along the primary differential pressure trace, (ii) superimposing a secondary differential pressure trace on the primary differential pressure trace and locating the secondary pressure drop along the secondary differential pressure trace, and (iii) measuring a time delay distance between the primary pressure drop and the secondary pressure drop.

The step of determining whether the primary pressure drop corresponds to a predetermined flow anomaly may comprise comparing the time delay with a characteristic anomaly time delay. The characteristic anomaly time delay preferably corresponds to a propagational velocity of the predetermined anomaly in the pipe. The predetermined anomaly may be selected from the group consisting of a plug, a slug, and a pseudo-slug. The predetermined anomaly is preferably a slug and the propagational velocity is less than approximately 1.2 times a mixture velocity of the fluid. Alternatively, the predetermined anomaly is a pseudo-slug and the propagational velocity is approximately 1.1 times a mixture velocity of the fluid.

The primary upstream measuring point and the secondary upstream measuring point are preferably positioned at distinct locations along the pipe and the primary downstream measuring point and the secondary downstream measuring point are preferably positioned at distinct locations along the pipe. The primary pipe distance is preferably greater than the secondary pipe distance. Specifically, the primary pipe distance is preferably approximately 132 cm and the secondary pipe distance is approximately 10 cm.

Preferably, the predetermined flow anomaly has a probable characteristic anomaly length and the primary pipe distance is greater than the probable characteristic anomaly length. Preferably, a pair of the predetermined flow anomalies are spaced apart by a probable anomaly spacing and the primary pipe distance is less than the probable anomaly spacing. Finally, the second pair of pressure measuring points are preferably positioned between the first pair of pressure measuring points.

In accordance with another embodiment of the present invention, an apparatus for identifying a predetermined flow anomaly in a pipe is provided comprising: an analysis pipe section; a first pair of pressure measuring points provided in the analysis section and including a primary upstream measuring point and a primary downstream measuring point separated by a primary pipe distance; a first differential pressure transducer coupled to the first pair of pressure measuring points; a second pair of pressure measuring points provided in the analysis section and including a secondary upstream measuring point and a secondary downstream measuring point separated by a secondary pipe distance; a second differential pressure transducer coupled to the second pair of pressure measuring points; and a differential pressure output port coupled to the first and second differential pressure transducers and operative to produce an output from which a primary drop in the first differential pressure, a secondary pressure drop in the second differential pressure, and a time delay between initiation of the primary pressure drop and initiation of the secondary pressure drop are identifiable so as to enable determination of the presence of a predetermined flow anomaly.

In accordance with yet another embodiment of the present invention, a method of identifying a predetermined multiphase flow anomaly in a pipe comprises the steps of: identifying an analysis pipe section containing a multiphase fluid flow; measuring a first differential pressure over time at a first pair of pressure measuring points positioned along the analysis pipe section, the first pair of pressure measuring points including a primary upstream measuring point and a primary downstream measuring point separated by a primary pipe distance; measuring a second differential pressure over time at a second pair of pressure measuring points positioned along the analysis pipe section, the second pair of pressure measuring points including a secondary upstream measuring point and a secondary downstream measuring point separated by a secondary pipe distance; determining whether regular amplitude variations exist in the first pressure measurement over time and the second pressure measurement over time; determining whether the existent regular amplitude variations include at least a first regular amplitude variation in the first pressure measurement having an absolute magnitude greater than a first minimum pressure differential; determining whether the existent regular amplitude variations include at least a second regular amplitude variation in the second pressure measurement having an absolute magnitude greater than a second minimum pressure differential; identifying a primary starting point of the first regular amplitude variation; identifying a secondary starting point of the second regular amplitude variation; and determining the nature of a predetermined multiphase flow anomaly moving through the pipe analysis section as a function of a time difference between the secondary starting point and the primary starting point.

The nature of the predetermined multiphase flow is preferably determined as a function of the flow velocity of the anomaly, and the flow velocity of the anomaly is preferably a function of the time difference between the primary starting point and the secondary starting point.

The method may comprise the step of indicating slug flow where the flow velocity of the anomaly is approximately 1.2 times a collective superficial velocity of the multiphase flow, indicating pseudo-slug flow where the flow velocity of the anomaly is less than approximately 1.2 times a collective superficial velocity of the multiphase flow, indicating plug flow where the existent regular amplitude variations do not include at least a first regular amplitude variation in the first pressure measurement having an absolute magnitude greater than a first minimum pressure differential and at least a second regular amplitude variation in the second pressure measurement having an absolute magnitude greater than a second minimum pressure differential, or indicating stratified/annular flow where no regular amplitude variations exist in the first pressure measurement over time and the second pressure measurement over time.

Accordingly, it is an object of the present invention to provide a method and apparatus to non-visually analyze multiphase fluid flow in a pipe and to identify predetermined flow anomalies within the fluid flow.

DETAILED DESCRIPTION OF THE INVENTION

Figure 1A:
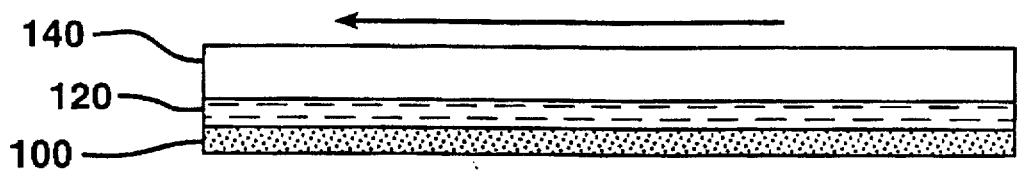
FIGS. 1A–1G illustrate flow patterns within a multiphase fluid within a pipe.
Figure 1B:
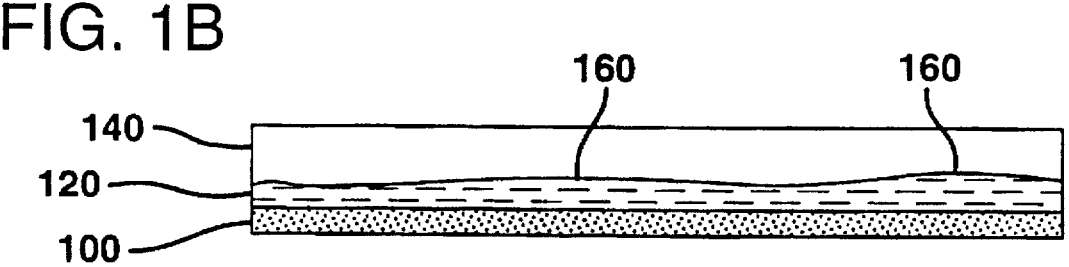
Figure 1C:
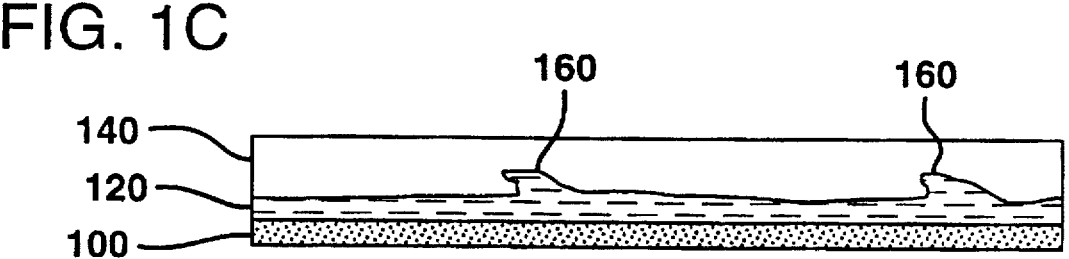
Figure 1D:
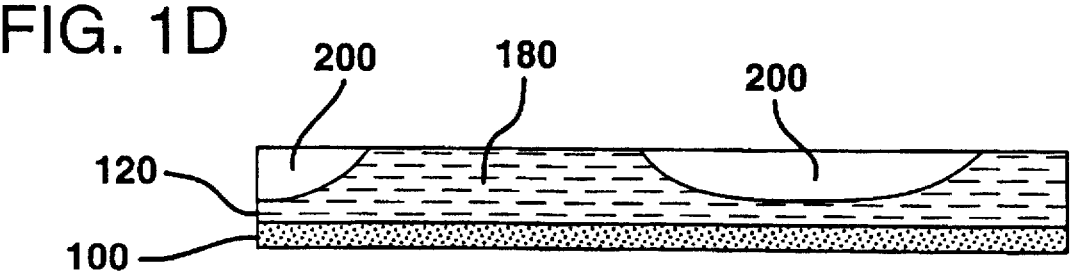
Figure 1E:
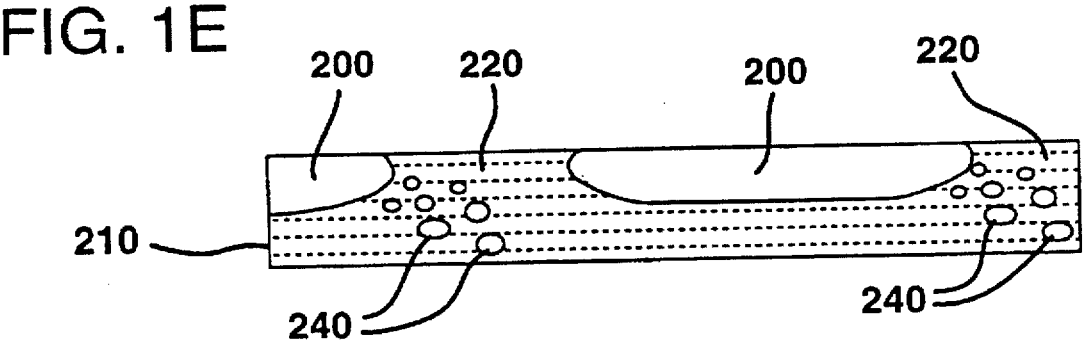
Figure 1F:
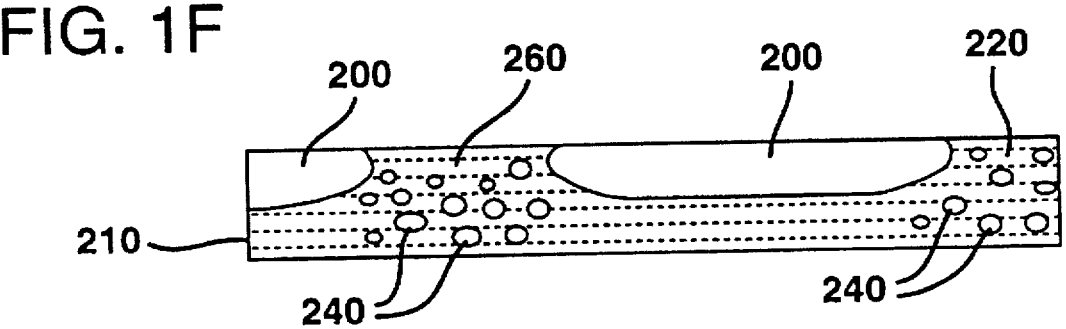
Figure 1G:
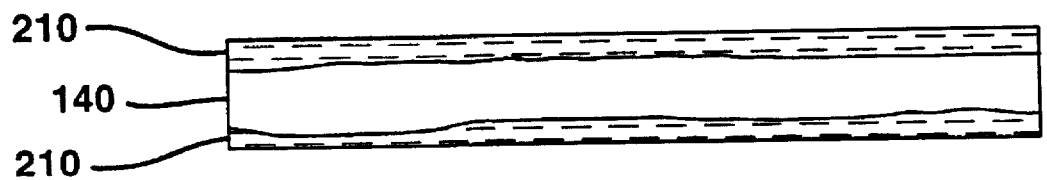

FIGS. 1A–1G illustrate the typical flow patterns and flow anomalies observed in multiphase pipe flow including a layer of water 100, a layer of oil 120, and a layer of gas 140. At low liquid and gas flow rates, see FIG. 1A, the three phases flow in a smooth stratified pattern. As the gas flow rate is increased, see FIGS. 1B and 1C, the interface between the oil 120 and gas 140 forms waves 160. If the liquid flows are increased, moving plugs of liquid 180 which completely fill a section of the pipe are formed in the flow, see FIG. 1D. In three-phase plug flow, the oil/water interface remains stratified while intermittent gas pockets 200 remove the oil from the top of the pipe. If the gas flow rate is increased from plug flow, moving slugs 220 are formed in the flow regime, see FIG. 1E. Characteristics of slug flow include mixing of the oil and water layers to form an oil/water layer 210, gas pockets 200 of increased length, and entrainment of gas bubbles 240 in the front of the slug 220, commonly referred to as the mixing zone. An additional increase in the gas velocity creates a flow pattern identified as pseudo-slug flow, see FIG. 1F. Pseudo-slugs 260 are similar to slugs 220, but the mixing zone extends through the slug length allowing occasional gas blow-through between adjacent gas pockets 200. At even higher gas flow rates, annular flow is reached, see FIG. 1G. Annular flow exists when the less dense fluid, the gas 140, flows in a core along the center of the pipe while the more dense fluid, the oil/water mixture 21, flows as an annular ring around the pipe wall.

Figure 2:
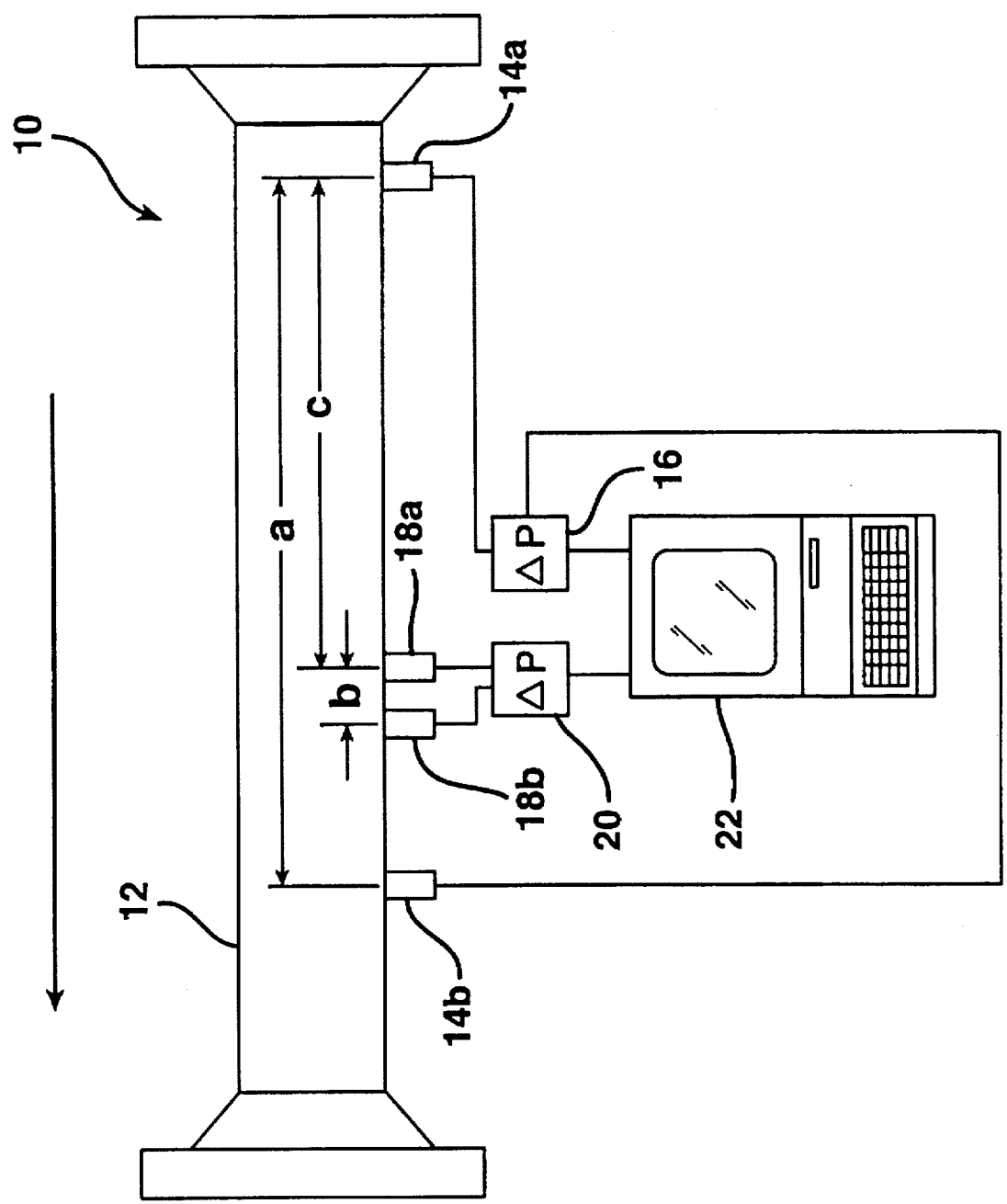
FIG. 2 is a schematic illustration of a multiphase flow analysis device according to the present invention.

A multiphase flow analysis device 10 for identifying a predetermined flow anomaly according to the present invention is illustrated in FIG. 2. An analysis pipe section 12 includes a primary upstream measuring tap 14a positioned at a primary upstream measuring point and a primary downstream measuring tap 14b positioned at a primary downstream measuring point separated from the upstream measuring point by a primary pipe distance a. A first differential pressure transducer 16 is coupled to the primary, or first, pair of pressure measuring taps 14a, 14b at the primary upstream and downstream measuring points. The analysis pipe section 12 also includes a secondary upstream measuring tap 18a positioned at a secondary upstream measuring point and a secondary downstream measuring tap 18b positioned at a secondary downstream measuring point separated from the upstream measuring point by a secondary pipe distance b which is less than the primary pipe distance a. A second differential pressure transducer 20 is coupled to the secondary pair of pressure measuring taps 18a, 18b at the primary upstream and downstream measuring points. In a preferred embodiment, the primary pipe distance a is approximately 132 cm and the secondary pipe distance b is approximately 10 cm.

The primary upstream measuring tap 14a is coupled to the negative port of the first differential pressure transducer 16 and the primary downstream measuring tap 14b is coupled to the positive port of the first differential pressure transducer 16. Accordingly, as a flow anomaly characterized by a region of increased pressure within the pipe, e.g., a slug, reaches the primary upstream measuring tap 14a, the differential pressure becomes negative. Similarly, the secondary upstream measuring tap 18a is coupled to the negative port of the second differential pressure transducer 20 and the secondary downstream measuring tap 18b is coupled to the positive port of the second differential pressure transducer 20. Accordingly, as a flow anomaly characterized by a region of increased pressure within the pipe, e.g., a slug, reaches the secondary upstream measuring tap 18a, the differential pressure becomes negative. The absolute value of the differential pressure at the second differential pressure transducer 20 is usually significantly less than the absolute value of the differential pressure at the first differential pressure transducer 16 because the secondary measuring taps 18a, 18b are more closely spaced than the primary measuring taps 14a, 14b. This significant difference between the absolute values of the two differential pressures aids in discriminating between a trace of the two differential pressures, as described below.

A computer 22 includes a differential pressure output port. The differential pressure output port may be in the form of a video display, a data output port, or any port adapted to display data indicative of the two differential pressures or to make the differential pressure data available for display. The computer 22 is coupled to the first and second differential pressure transducers 16, 20. The computer 22 is programmed to produce an output from which a primary drop in the first differential pressure, a secondary drop in the second differential pressure, and a time delay between initiation of the primary pressure drop and initiation of the secondary pressure drop are identifiable so as to enable determination of the presence of the predetermined flow anomaly. In one embodiment, the computer includes a data acquisition board coupled to the output of the first and second transducers 16, 20 to enable recording of the time delay between initiation of the primary pressure drop and initiation of the secondary pressure drop.

Figure 3:
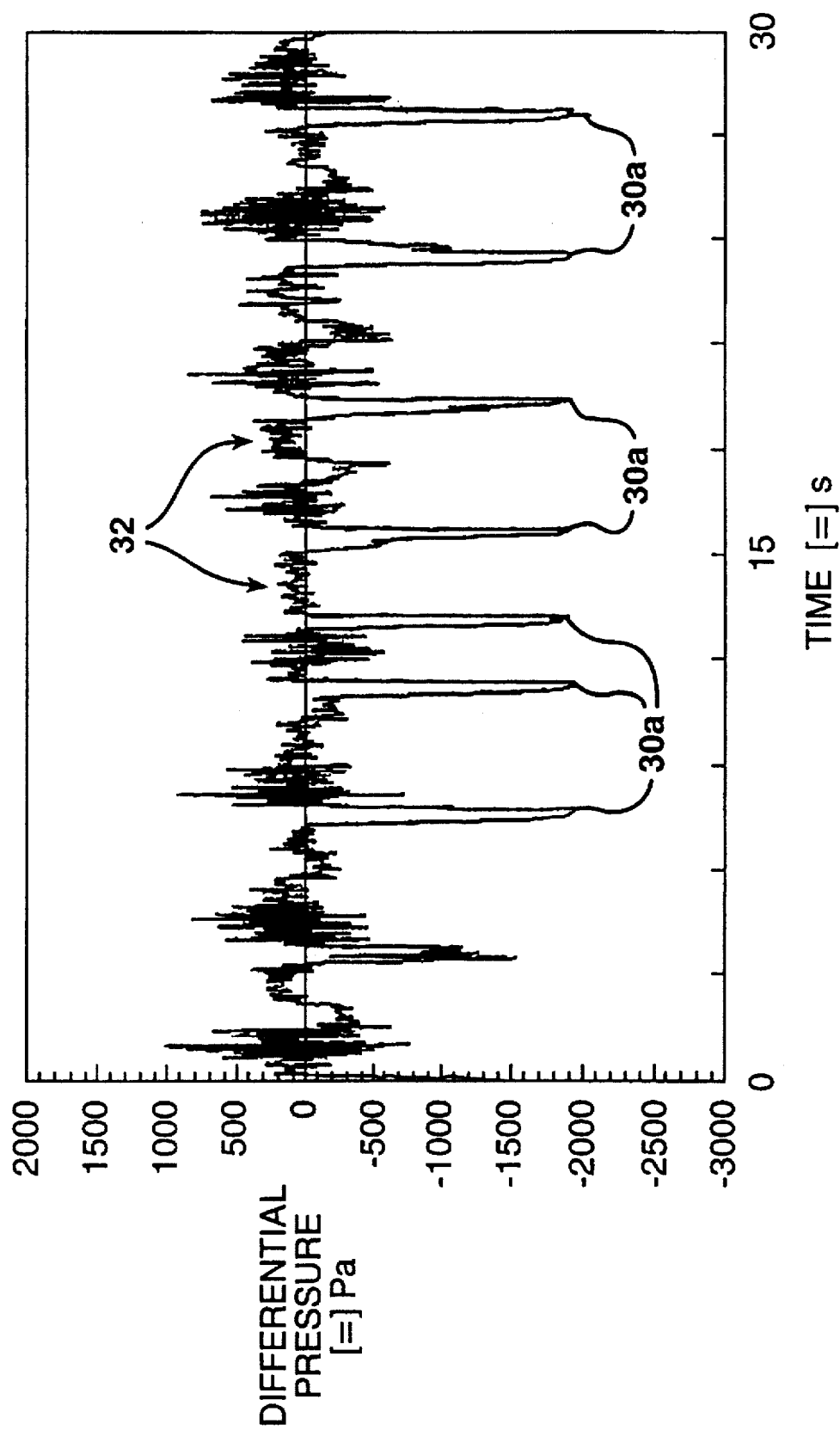
FIG. 3 is an illustration of a computer-generated pressure trace of a differential pressure transducer.

FIG. 3 is an illustration of a computer-generated pressure trace of the differential pressure output of the first pressure transducer 16. Primary differential pressure drops 30a, i.e., readily apparent and relatively significant decreases in differential pressure measured across the primary pair of pressure measuring taps 14a, 14b, are identifiable in the pressure trace at the first pressure transducer 16. Although not shown in FIG. 3, secondary differential pressure drops, i.e., readily apparent and relatively significant decreases in differential pressure measured across the secondary pair of pressure measuring taps 18a, 18b can be identified in a similar manner. It is contemplated by the present invention that the first pressure transducer 16, the second pressure transducer 18, and the computer 22, illustrated as separate components in FIG. 2, could be replaced with a single device comprising a computer and integral components functioning as pressure transducers.

Figure 4:
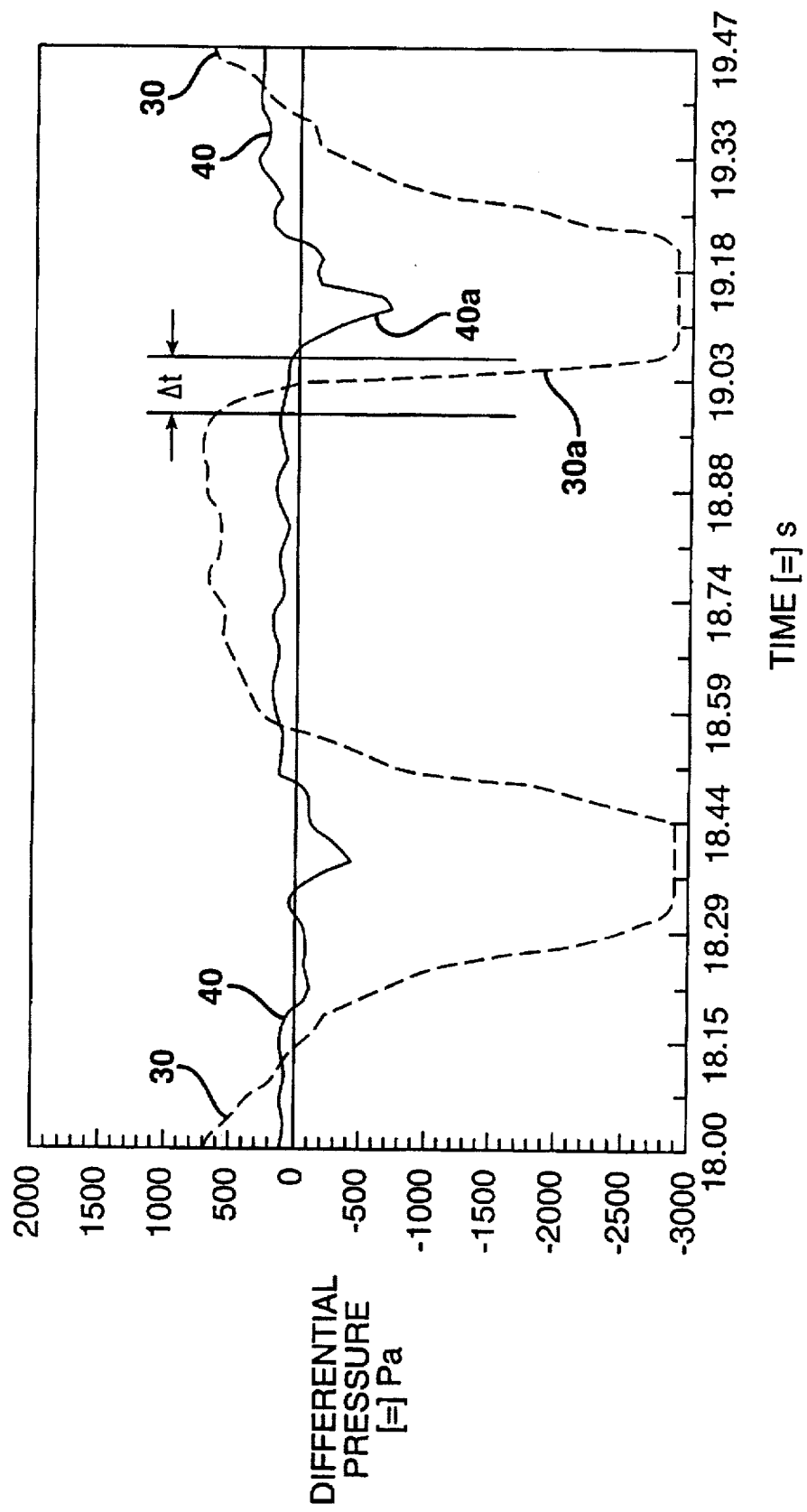
FIGS. 4 and 5 are illustrations of computer-generated pressure traces of a pair differential pressure transducers.
Figure 5:
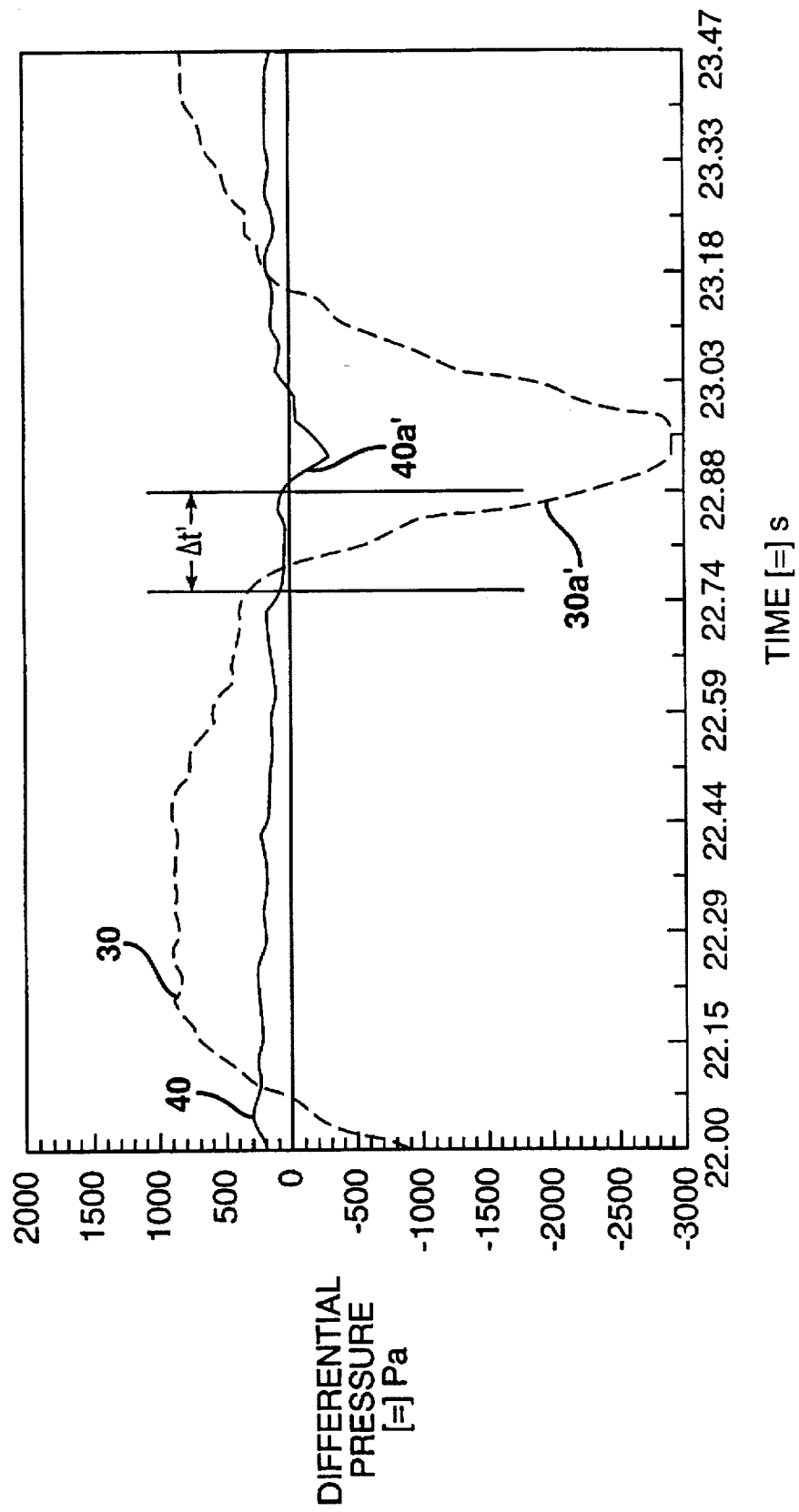

FIGS. 4 and 5 illustrate portions of a computer generated primary differential pressure trace 30, i.e., a trace of the differential pressure measured between the primary pressure taps 14a, 14b, and a secondary differential pressure trace 40, i.e., the differential pressure measured between the secondary pressure taps 18a, 18b. Two primary differential pressure drops 30a, 30a' and two secondary differential pressure drops 40a, 40a' are identifiable in FIGS. 4 and 5. Further, time delays Δt and Δt' between initiation of the primary pressure drops 30a, 30a' and the secondary pressure drops 40a, 40a' are also identifiable from the traces of FIGS. 4 and 5.

A plug, a slug, and a pseudo-slug are specific flow anomalies which are identifiable according to the present invention. Whether the primary pressure drop corresponds to the presence of a plug, a slug, or a pseudo-slug depends upon the magnitude of the primary pressure drop and the magnitude of the time delays Δt and Δt'. Each flow anomaly will cause characteristic primary and secondary pressure drops in the pipe. Further, each flow anomaly has a characteristic time delay which is directly proportional to its propagational velocity within the pipe. The magnitude of the primary and secondary pressure drops and the magnitude of the time delays Δt and Δt' are noted to determine the nature of a flow anomaly within the pipe.

For example, a slug is positively identified where (i) the primary pressure drop is characterized by a pressure drop having an absolute magnitude of at least approximately 1500 Pa, a primary minimum pressure differential, (ii) the secondary pressure drop is characterized by a pressure drop having an absolute magnitude of at least approximately 150 Pa, a secondary minimum pressure differential, and (iii) where the time delay Δt' indicates an anomaly propagational velocity which is approximately 1.2 times the mixture velocity of the fluid within the pipe.

A pseudo-slug will exhibit pressure drops similar to those of the slug; however, for a pseudo-slug the time delay Δt, Δt' will be longer than the slug time delay, indicating an anomaly propagational velocity which is approximately 1.1 times the mixture velocity of the fluid within the pipe, as opposed to 1.2 times the mixture velocity.

A plug is positively identified where the primary pressure drop is characterized by a pressure drop having an absolute magnitude of less than 1500 Pa without regard to its propagational velocity. It is contemplated by the present invention that it is possible that the characteristic pressure drops and propagational velocities corresponding to specific flow anomalies may vary between different types of multiphase fluid flows. Accordingly, in practicing the present invention, the characteristic pressure drops and propagational velocities indicated above may be verified or modified through supplemental visual flow analysis of a specific fluid flow.

The propagational velocity of an anomaly is determined from the time delay Δt, Δt' by (i) noting the initiation or start of the primary pressure drop 30a, indicating that an anomaly has reached the upstream primary pressure tap 14a, (ii) noting the initiation or start of the secondary pressure drop 40a, indicating that the anomaly has reached the upstream secondary pressure tap 18a, (iii) measuring the time delay Δt, Δt' between the initiation of each pressure drop, and (iv) dividing the distance c by the time delay Δt, Δt'. The distance c between the upstream primary pressure tap 14a and the upstream secondary pressure tap 18a is a predetermined value because the primary upstream measuring tap 14a and the secondary upstream measuring tap 18a are positioned at distinct locations separated by a known distance along the analysis pipe section 12.

The mixture velocity is the sum of the superficial gas velocity, $V_{sg}$, and the superficial liquid velocity, $V_{sl}$, and, as will be appreciated by those skilled in the art, is commonly determined through measurements at a diagnostic point (not shown) along the pipe and by dividing the respective volumetric flow rates by the corresponding cross sectional area of the flow.

The second pair of pressure measuring points are positioned between the first pair of pressure measuring points so as to further distinguish the primary differential pressure trace 30 from the secondary differential pressure trace 40. To ensure proper identification of a primary pressure drop corresponding to a predetermined flow anomaly, the primary pipe distance is greater than a probable characteristic anomaly length and less than a probable anomaly spacing. For example, since a slug is typically greater than one meter in length, as noted above, in a preferred embodiment of the present invention, the primary pipe distance a is approximately 132 cm.

Figure 6:
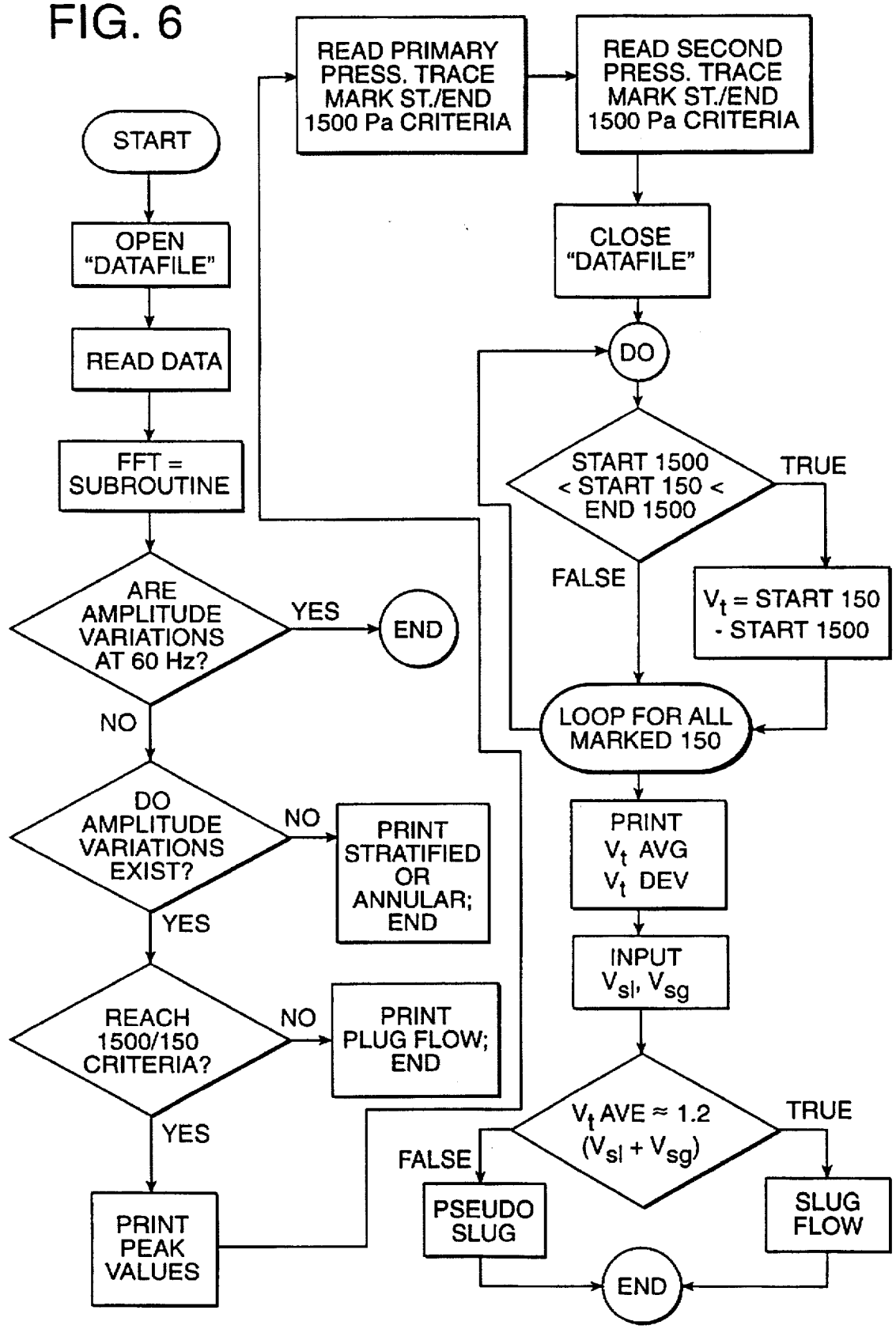
FIG. 6 is a flow chart representing a multiphase flow analysis according to the present invention.

The flow chart of FIG. 6 further illustrates a method of identifying a predetermined multiphase flow anomaly according to another embodiment of the present invention. The computer 22, described above, opens a data file and reads the data output from the first and second pressure transducers 16, 20. A fast fourier transform subroutine is then performed to enable analysis of the data. The data includes random amplitude variations due to ordinary system errors and disturbances and regular amplitude variations having magnitudes substantially exceeding those of the random amplitude variations. Regular amplitude variations are identifiable as amplitude variations approximately equal in magnitude which occur at fairly regular intervals. For example, with reference to FIG. 3, random amplitude variations are indicated at 32 and regular amplitude variations are indicated at 30a. It is contemplated by the present invention that under certain limited circumstances it may be difficult to distinguish between regular and random amplitude variations and that some degree of experimentation may be necessary to accurately distinguish between regular and random amplitude variations.

The data is then analyzed to determine if any regular amplitude variations exist at 60 Hz. If regular amplitude variations exist at 60 Hz, the operational sequence is ended because regular amplitude variations at 60 Hz are likely to be the result of interference caused by a proximate electrical device or some other device producing a interference at 60 Hz. It is contemplated by the present invention that other amplitude variations likely to be the result of system errors, design defects, and exterior interference may be detected at this step as well.

If regular amplitude variations do not exist at 60 Hz, inquiry is then made as to whether any regular amplitude variations exist at all. If no regular amplitude variations are found, a print operation indicates stratified or annular flow, i.e., no plugs, slugs, or pseudo-slugs are present in the flow. If regular amplitude variations are found in the data, the data is analyzed to determine if the regular amplitude variations indicate that the differential pressure at the first pressure transducer 16 exceeds 1500 Pa and the differential pressure at the second pressure transducer exceeds 150 Pa. If the regular amplitude variations do not exceed these 1500/150 criteria, a print operation indicates plug flow. It is contemplated by the present invention, given that wavy flow tends to be characterized by more frequent and smaller regular amplitude variations than plug flow, an additional step may be incorporated into the process illustrated in FIG. 6 in order to further discriminate between plug flow and wavy flow.

If the regular amplitude variations do exceed the 1500/150 criteria, the peak value at the first differential pressure transducer 16 and the second differential pressure transducer 20 are printed and the computer proceeds in the analysis described below to determine if the flow is slug flow or pseudo-slug flow.

To discriminate between slug flow and pseudo-slug flow, the start and the end of each regular amplitude variation meeting the 1500 Pa criterion at the first differential pressure transducer 16 are marked, as is the start of each regular amplitude variation meeting the 150 Pa criterion at the second differential pressure transducer 20. Next, the start of each regular amplitude variation meeting the 150 Pa criterion at the second differential pressure transducer 20 is analyzed to determine if it falls between the start and end of a regular amplitude variation satisfying 1500 Pa criterion at the first differential pressure transducer 16 (Start 1500 Pa<start 150 Pa<end 1500 Pa). If the outcome of this analysis is false, i.e., the start of a regular amplitude variation meeting the 150 Pa criterion does not fall between the start and end of the 1500 Pa regular amplitude variation, a new regular amplitude variation meeting the 150 Pa criterion is analyzed in the same manner. If the outcome of the analysis is true, the time delay between the start of the regular amplitude variation at the first differential pressure transducer 16 and the start of the regular amplitude variation at the second differential pressure transducer 20 is used to compute, in the manner described above, the propagational velocity of an anomaly causing the regular amplitude variations [$V_f \propto$(start 150 Pa–start 1500 Pa)]. After all of the regular amplitude variations meeting the 150 Pa Criterion at the second differential pressure transducer 20 have been analyzed in this manner, an average value for $V_f$ and a corresponding deviation, based on each of the computed values for $V_f$, are printed. Next, the superficial gas velocity, $V_{sg}$, and the superficial liquid Velocity, $V_{sl}$, as measured in the pipe system or as determined otherwise, are input and the average value for $V_f$ is compared to the mixture velocity, i.e., the sum of the superficial gas velocity, $V_{sg}$ and the superficial liquid Velocity $V_{sl}$. If the average value for $V_f$ is approximately equal to 1.2 times the mixture velocity, slug flow is indicated. If the average value for $V_f$ is less than approximately 1.2 times the mixture velocity, pseudo-slug flow is indicated.

Having described the invention in detail and by reference to preferred embodiments thereof, it will be apparent that modifications and variations are possible without departing from the scope of the invention defined in the appended claims.

We claim:

1. A method of identifying a predetermined multiphase flow anomaly in a pipe comprising the steps of:

identifying an analysis pipe section, said analysis pipe section containing a multiphase fluid flow;

measuring a first differential pressure at a first pair of pressure measuring points positioned along said analysis pipe section, said first pair of pressure measuring points including a primary upstream measuring point and a primary downstream measuring point separated by a primary pipe distance;

measuring a second differential pressure at a second pair of pressure measuring points positioned along said analysis pipe section, said second pair of pressure measuring points including a secondary upstream measuring point and a secondary downstream measuring point separated by a secondary pipe distance;

identifying a primary drop in said first differential pressure;

identifying a secondary drop in said second differential pressure;

measuring a time delay between initiation of said primary pressure drop and initiation of said secondary pressure drop; and determining as a function of said time delay whether said primary pressure drop corresponds to said predetermined multiphase flow anomaly moving through the pipe analysis section.

2. A method of analyzing a fluid flow as claimed in claim 1, wherein said step of identifying a primary drop in said first differential pressure comprises plotting a primary differential pressure trace as a function of time and locating said primary pressure drop along said primary differential pressure trace.

3. A method of analyzing a fluid flow as claimed in claim 2 wherein said primary pressure drop is characterized by a pressure drop of at least approximately 1500 Pa.

4. A method of analyzing a fluid flow as claimed in claim 1, wherein said step of identifying a secondary drop in said second differential pressure comprises plotting a secondary differential pressure trace as a function of time and locating said secondary pressure drop along said secondary differential pressure trace.

5. A method of analyzing a fluid flow as claimed in claim 4 wherein said secondary pressure drop is characterized by a pressure drop of at least approximately 150 Pa.

6. A method of analyzing a fluid flow as claimed in claim 1 wherein said step of measuring a time delay comprises (i) plotting a primary differential pressure trace as a function of time and locating said primary pressure drop along said primary differential pressure trace, (ii) superimposing a secondary differential pressure trace on said primary differential pressure trace and locating said secondary pressure drop along said secondary differential pressure trace, and (iii) measuring a time delay distance between said primary pressure drop and said secondary pressure drop.

7. A method of analyzing a fluid flow as claimed in claim 1 wherein said step of determining whether said primary pressure drop corresponds to said predetermined flow anomaly comprises comparing said time delay with a characteristic anomaly time delay.

8. A method of analyzing a fluid flow as claimed in claim 7 wherein said characteristic anomaly time delay corresponds to a propagational velocity of said predetermined anomaly in said pipe.

9. A method of analyzing a fluid flow as claimed in claim 8 wherein said predetermined anomaly is a slug and said propagational velocity is approximately 1.2 times a mixture velocity of said fluid.

10. A method of analyzing a fluid flow as claimed in claim 8 wherein said predetermined anomaly is a pseudo-slug and said propagational velocity is approximately 1.1 times a mixture velocity of said fluid.

11. A method of analyzing a fluid flow as claimed in claim 1 wherein said predetermined anomaly is selected from the group consisting of a plug, a slug, and a pseudo-slug.

12. A method of analyzing a fluid flow as claimed in claim 1 wherein said primary upstream measuring point and said secondary upstream measuring point are positioned at distinct locations along said pipe.

13. A method of analyzing a fluid flow as claimed in claim 1 wherein said primary downstream measuring point and said secondary downstream measuring point are positioned at distinct locations along said pipe.

14. A method of analyzing a fluid flow as claimed in claim 1 wherein said primary pipe distance is greater than said secondary pipe distance.

15. A method of analyzing a fluid flow as claimed in claim 14 wherein said primary pipe distance is approximately 132 cm and said secondary pipe distance is approximately 10 cm.

16. A method of analyzing a fluid flow as claimed in claim 1 wherein said predetermined flow anomaly has a probable characteristic anomaly length and said primary pipe distance is greater than said probable characteristic anomaly length.

17. A method of analyzing a fluid flow as claimed in claim 1 wherein a pair of said predetermined flow anomalies are spaced apart by a probable anomaly spacing and said primary pipe distance is less than said probable anomaly spacing.

18. A method of analyzing a fluid flow as claimed in claim 1 wherein said second pair of pressure measuring points are positioned between said first pair of pressure measuring points.

19. An apparatus for identifying a predetermined flow anomaly in a pipe comprising:

an analysis pipe section;

a first pair of pressure measuring points provided in said analysis section and including a primary upstream measuring point and a primary downstream measuring point separated by a primary pipe distance;

a first differential pressure transducer coupled to said first pair of pressure measuring points;

a second pair of pressure measuring points provided in said analysis section and including a secondary upstream measuring point and a secondary downstream measuring point separated by a secondary pipe distance;

a second differential pressure transducer coupled to said second pair of pressure measuring points; and a differential pressure output port coupled to said first and second differential pressure transducers and operative to produce an output from which a primary drop in said first differential pressure, a secondary pressure drop in said second differential pressure, and a time delay between initiation of said primary pressure drop and initiation of said secondary pressure drop are identifiable so as to enable determination of the presence of said predetermined flow anomaly.

20. An apparatus for identifying a predetermined flow anomaly as claimed in claim 19 wherein said primary upstream measuring point and said secondary upstream measuring point are positioned at distinct locations along said pipe.

21. An apparatus for identifying a predetermined flow anomaly as claimed in claim 19 wherein said primary downstream measuring point and said secondary downstream measuring point are positioned at distinct locations along said pipe.

22. An apparatus for identifying a predetermined flow anomaly as claimed in claim 19 wherein said primary pipe distance is greater than said secondary pipe distance.

23. An apparatus for identifying a predetermined flow anomaly as claimed in claim 22 wherein said primary pipe distance is approximately 132 cm and said secondary pipe distance is approximately 10 cm.

24. An apparatus for identifying a predetermined flow anomaly as claimed in claim 19 wherein said predetermined flow anomaly has a probable characteristic anomaly length and said primary pipe distance is greater than said probable characteristic anomaly length.

25. An apparatus for identifying a predetermined flow anomaly as claimed in claim 19 wherein a pair of said predetermined flow anomalies are spaced apart by a probable anomaly spacing and said primary pipe distance is less than said probable anomaly spacing.

26. An apparatus for identifying a predetermined flow anomaly as claimed in claim 19 wherein said second pair of pressure measuring points are positioned between said first pair of pressure measuring points.

27. An apparatus for identifying a predetermined flow anomaly as claimed in claim 19 wherein said predetermined anomaly is selected from the group consisting of a plug, a slug, and a pseudo-slug.

28. A method of identifying a predetermined multiphase flow anomaly in a pipe comprising the steps of:

identifying an analysis pipe section, said analysis pipe section containing a multiphase fluid flow;

measuring a first differential pressure over time at a first pair of pressure measuring points positioned along said analysis pipe section, said first pair of pressure measuring points including a primary upstream measuring point and a primary downstream measuring point separated by a primary pipe distance;

measuring a second differential pressure over time at a second pair of pressure measuring points positioned along said analysis pipe section, said second pair of pressure measuring points including a secondary upstream measuring point and a secondary downstream measuring point separated by a secondary pipe distance;

determining whether regular amplitude variations exist in said first pressure measurement over time and said second pressure measurement over time;

determining whether said existent regular amplitude variations include at least a first regular amplitude variation in said first pressure measurement having an absolute magnitude greater than a first minimum pressure differential;

determining whether said existent regular amplitude variations include at least a second regular amplitude variation in said second pressure measurement having an absolute magnitude greater than a second minimum pressure differential;

identifying a primary starting point of said first regular amplitude variation;

identifying a secondary starting point of said second regular amplitude variation; and determining the nature of a predetermined multiphase flow anomaly moving through the pipe analysis section as a function of a time difference between said secondary starting point and said primary starting point.

29. A method of identifying a predetermined multiphase flow anomaly in a pipe as claimed in claim 28 wherein the nature of predetermined multiphase flow is determined as a function of the flow velocity of said anomaly, and wherein the flow velocity of said anomaly is a function of the time difference between said primary starting point and said secondary starting point.

30. A method of identifying a predetermined multiphase flow anomaly in a pipe as claimed in claim 29 comprising the step of indicating slug flow where the flow velocity of said anomaly is approximately 1.2 times a collective superficial velocity of the multiphase flow.

31. A method of identifying a predetermined multiphase flow anomaly in a pipe as claimed in claim 29 comprising the step of indicating pseudo-slug flow where the flow velocity of said anomaly is less than approximately 1.2 times a collective superficial velocity of the multiphase flow.

32. A method of identifying a predetermined multiphase flow anomaly in a pipe as claimed in claim 28 comprising the step of indicating plug flow where said existent regular amplitude variations do not include at least a first regular amplitude variation in said first pressure measurement having an absolute magnitude greater than a first minimum pressure differential and at least a second regular amplitude variation in said second pressure measurement having an absolute magnitude greater than a second minimum pressure differential.

33. A method of identifying a predetermined multiphase flow anomaly in a pipe as claimed in claim 28 comprising the step of indicating stratified/annular flow where no regular amplitude variations exist in said first pressure measurement over time and said second pressure measurement over time.

* * * * *